Figure 1:
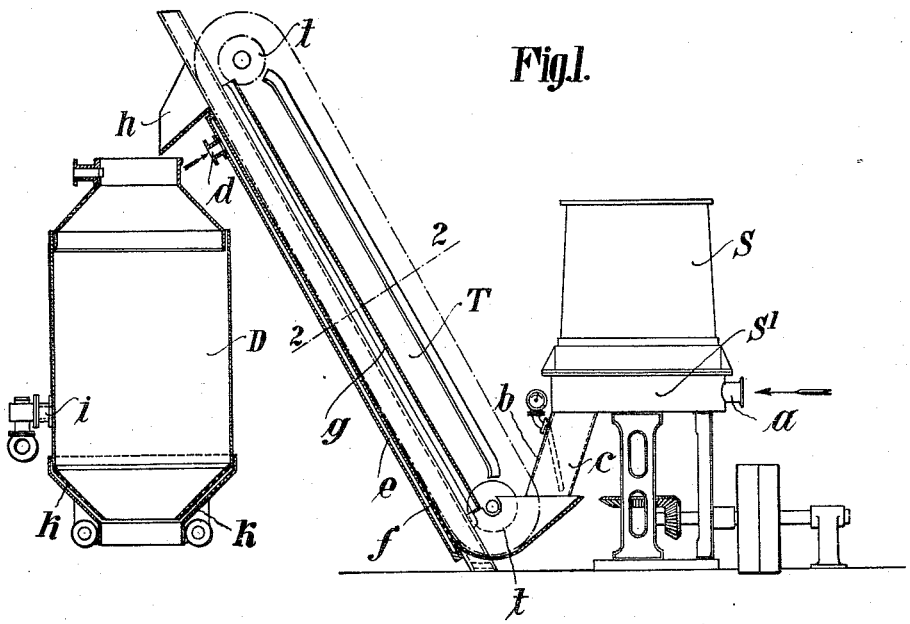

H. BOSSE.
PROCESS OF PRODUCING JUICE FROM BEET ROOTS.
APPLICATION FILED JULY 10, 1911.

1,005,931.

Patented Oct. 17, 1911.

Witnesses:
W. A. Williams
Dudley Browne

Inventor.
Hermann Bosse,
by Browne & Phelps
Attorneys.

UNITED STATES PATENT OFFICE.

HERMANN BOSSE, OF HECKLINGEN, GERMANY.

PROCESS OF PRODUCING JUICE FROM BEET-ROOTS.

1,005,931.  Specification of Letters Patent.  Patented Oct. 17, 1911.

Application filed July 10, 1911. Serial No. 637,709.

*To all whom it may concern:*

Be it known that I, HERMANN BOSSE, a subject of the Emperor of Germany, and residing at Hecklingen, Germany, have invented a certain new and useful Process of Producing Juice from Beet-Roots, of which the following is a specification.

My invention relates to improvements in a process of obtaining juice from beet-root chips, in which the chips are subjected either to diffusion or to pressure.

In the diffusion process it has been customary to have the temperatures, particularly in the first diffuser, as high as possible, and the efforts of the manufacturer are directed to avoid as far as possible everything that might cool the chips. For this reason the fresh beet-root chips are brought to the temperature of the hot juice, that is to about 70 degrees centigrade, before the hot juice is added. Various means have been suggested to heat the chips; however none of the means now in use give satisfactory results. The juice designed to be used in the diffusion process must previously be heated to the said temperature of 70 degrees centigrade, and this may be done for example in special preheaters. Recently it has been suggested to make use in the diffusion process of the juice which is obtained from the chips by a pressing operation to which the chips are subjected after they have undergone the diffusion process. This, however, has been difficult, because the said juice must first be separated from its slimy ingredients, which requires expensive apparatus. The separation also causes a considerable reduction of the temperature of the juice, and therefore a fermentation of the latter.

If the juice is obtained by pressing the chips the latter, and also the juice obtained from the press, must likewise be heated to high temperature, for which purpose they are passed through a preheating apparatus.

The object of the improvements is to provide a process whereby the juice is removed from the chips in a more economical way. And with this object in view my invention consists in using steam under pressure for heating the chips before separating the juice therefrom and for maintaining the temperature of the liquids which come from the press.

Heretofore the use of steam under pressure was supposed to be unsuitable for heating the chips, because the chips were burned thereby. To avoid this the chips are caused to pass through a chamber to which a current of compressed steam is admitted, and while thus moving through the said chamber the chips eagerly absorb the steam, whereby they are heated to the desired temperature, and as soon as the latter is attained, the chips leave the zone of the steam. Therefore the chips are exposed to the steam a short time only, so that they can not be burned. Preferably steam of comparatively low pressure is used, for example steam of a little more than 100 degrees centigrade, because at this temperature heating is effected most speedily.

For the purpose of explaining the invention an apparatus suitable for carrying the same into effect has been shown in the accompanying drawing in which the same letters of reference have been used in all the views to indicate corresponding parts.

Figure 2:
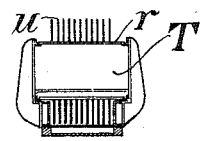
Figure 3:
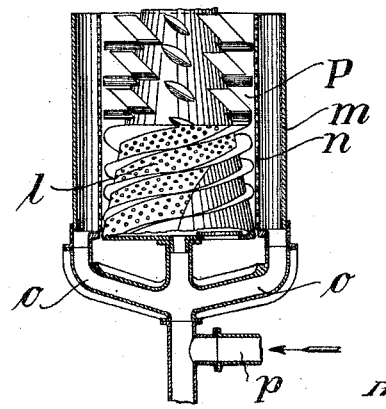

In said drawing—Figure 1, is a diagrammatical side view partly in section of the cutting machine, the conveyer, and the first diffuser, Fig. 2, is a cross-section of the conveyer taken on the line 2—2 of Fig. 1, and Fig. 3, is a vertical section of the press to which the chips are supplied from the diffusion battery.

In the embodiment of my invention in which the juice is extracted from the beet-root chips by diffusion the process is preferably carried out in the following way. The beets are first disintegrated in a cutting machine S of any known or preferred construction from which they fall through a chamber $S^1$ and a gutter $c$ into a chip conveyer T. The cutting apparatus is closed all around, and the gutter $c$ is covered by a lid $b$. Below the cutting disk the chamber $S^1$ is provided with an inlet stud $a$ through which steam under pressure can be admitted in such a way as to flow through the chamber $S^1$, so that the chips fall through a current of steam and eagerly absorb the latter and the water of condensation. As the steam and the water of condensation are thus absorbed by the chips no juice is lost during the further transmission of the chips to the other apparatus, because the water does not drip from the chips. The comparatively short passage of the chips through the current of steam, which is about 14 inches, is sufficient to heat the chips to a temperature of about 90 degrees centigrade. If desired the chamber S¹ may consist of several superposed sections which are successuvely traversed by the chips. In this case the chips are in contact with the steam for a longer time, so that they can be heated to a higher temperature, and the steam is more intensely utilized. The chips which have thus been heated are conveyed to a diffusion apparatus D. The conveyer may have any desired construction. In the example shown it consists of a belt $r$ passed over two pulleys $t$ and provided on its outer surface with racks $u$. Preferably the conveyer is provided with a double bottom $e$, and to the chamber which is thus formed steam is admitted through an inlet stud $d$. Near its lower end the inner bottom is formed with apertures $f$ through which steam is directly admitted to the chips so that the latter pass through the steam. Within the conveyer a partition $g$ is provided by means of which the steam is conducted upward and over the whole length of the conveyer. From the conveyer T the chips fall through a chute $h$ and into the diffusion battery D the first diffuser only being shown in the drawing. The said diffusion apparatus is provided with an inlet stud $i$ through which steam is admitted and which is disposed at such a distance above a sieve $k$, that the chips which fall through the steam arrive on the sieve before being burned.

While in describing the invention reference has been made to an apparatus in which heating means are provided within the cutting apparatus, the conveyer, and the diffusion apparatus, it will be understood, that under certain circumstances the chips may be sufficiently heated, if such heating means are provided in one or two members only of the said apparatus. After the juice has been extracted the hot chips are brought into a press P which in the example shown consists of a pressing cylinder $l$ and a double wall $m\ n$ providing a steam jacket. The inner wall $n$ of the latter and the cylinder $l$ are foraminated. The liquid which is extracted from the chips within the press flows through the holes of the cylinder $l$ and the wall $n$, and it is withdrawn through an outlet $o$. The latter is provided with a stud $p$ through which steam at low pressure is admitted which fills up all the spaces of the press and prevents the liquid from cooling when being discharged from the press and from being brought in contact with the air. Thereby fermentation of the liquid is prevented, and the liquid is kept at high temperature, so that it can directly be returned to the diffusion apparatus.

If diffusion is not used, and the juice is produced by pressing, the chips are likewise passed through a current of steam within the cutting machine or within the conveyer. The residues from the press are either dried and swelled by means of water which has been heated nearly to boiling temperature, and if necessary with addition of steam, or they are pressed once more. If desired the residues are again swelled and again pressed. Also during the last pressing operation steam is admitted to the press, as is shown in Fig. 3. In a similar way steam may be used each time the chips are pressed. In order to separate the sugar from the chips more thoroughly and to obtain a higher concentration of the juice I prefer to add the juice from the second pressing operation to the heated chips prior to the first pressing operation, and more particularly slightly before or upon their admission into the press. The leaching of the fresh chips is made more effective by passing the liquids through the chips in a direction opposite to the passage of the latter.

I claim herein as my invention:

1. The herein described process of producing juice from beet-roots, which consists in disintegrating the beet roots, passing the same through a current of steam, extracting juice therefrom, and subjecting the same to a pressing operation in the presence of steam.

2. The herein described process of producing juice from beet-roots, which consists in disintegrating the beet roots, passing the same within the cutting machine through a current of steam, extracting juice therefrom, and subjecting the same to a pressing operation in the presence of steam.

3. The herein described process of producing juice from beet-roots, which consists in disintegrating the beet-roots, conveying the same to an apparatus for extracting the juice while admitting steam thereto, extracting the juice from the disintegrated beet-roots, and subjecting the same to a pressing operation in the presence of steam.

4. The herein described process of producing juice from beet-roots, which consists in disintegrating the beet-roots, causing the same to fall through steam, extracting the juice therefrom within a diffusion battery, and subjecting the same to a pressing operation in the presence of steam.

5. The herein described process of producing juice from beet-roots, which consists in disintegrating the beet-roots, causing the same to fall through steam, extracting the juice therefrom within a diffusion battery, subjecting the same to a pressing operation in the presence of steam, and supplying the liquid extracted from the beet-roots by the pressing operation to the diffusion battery.

6. The herein described process of producing juice from beet-roots, which consists in disintegrating the said beet-roots, passing the same through a current of steam, subjecting the same to a pressing operation, swelling the residue, and again subjecting the swollen residue to a pressing operation in the presence of steam.

7. The herein described process of producing juice from beet-roots, which consists in disintegrating the beet-roots, passing the same through a current of steam, extracting the juice from the same, pressing the residue in the presence of steam, and supplying the juice obtained by the pressing operation to the said extracting process.

In witness whereof I have hereunto set my hand in presence of two witnesses.

HERMANN BOSSE.

Witnesses:
 Louis A. Katz,
 Ernst A. Bleirot.

Copies of this patent may be obtained for five cents each, by addressing the "Commissioner of Patents, Washington, D. C."